Patented May 27, 1952

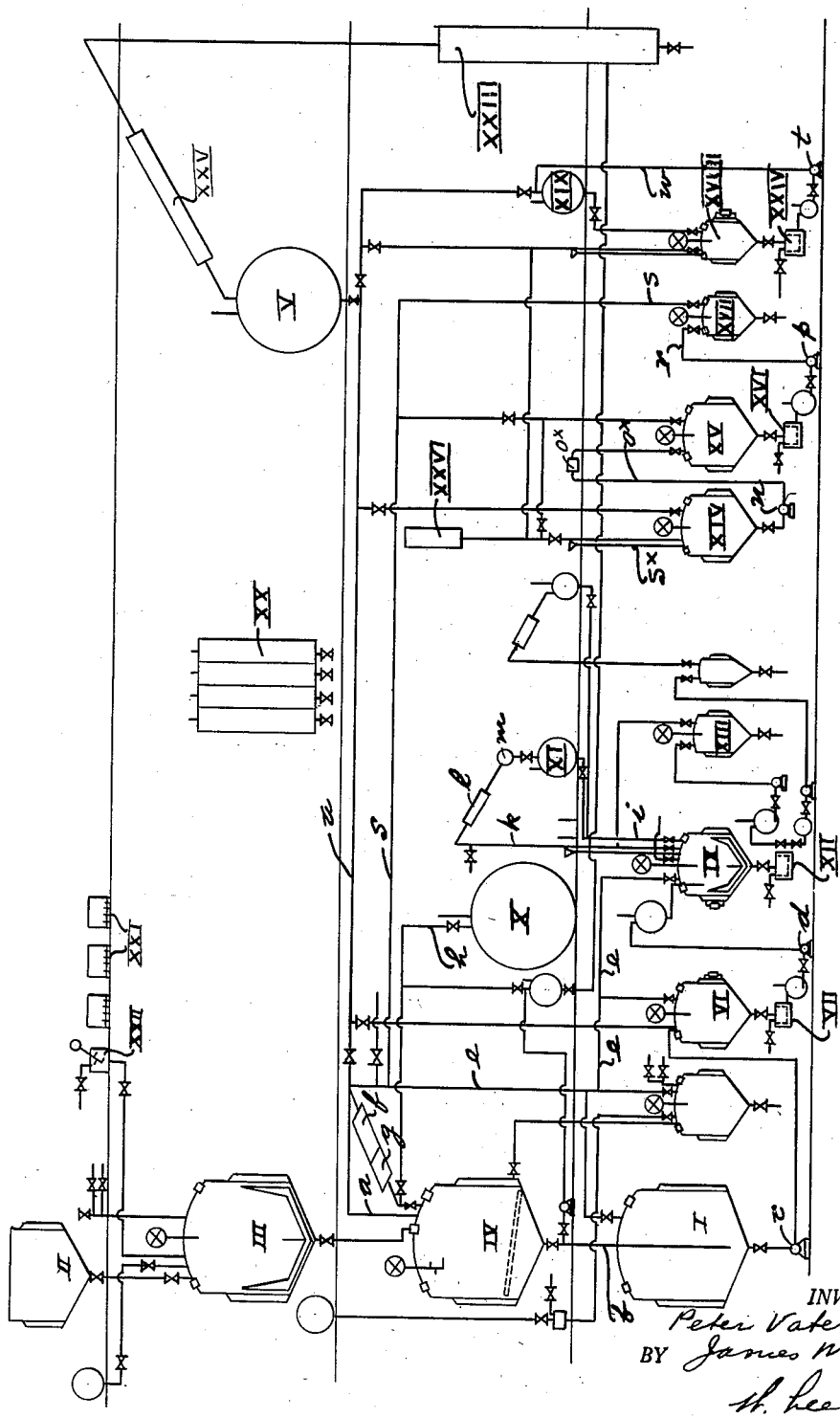

2,598,468

UNITED STATES PATENT OFFICE 2,598,468

METHOD FOR PRODUCTION OF CHOLESTEROL

Peter Vaterrodt, Rutherford, and James McNellis, Fairlawn, N. J., assignors to Botany Mills, Inc., Passaic, N. J., a corporation of New Jersey Application February 3, 1950, Serial No. 142,191

3 Claims. (Cl. 260—397.2)

The present invention relates to a process having as its object increase in yield of cholesterol from lanolin alcohols as compared with the yield in present process, the elimination of many steps now practiced in the commercial recovery of cholesterol, and the reduction of time and cost of production.

The characteristic of our process is the step of precipitating out impure lanosterol by the use of a mixture of solvents, such as acetone-methanol, and separating the lanosterol from the solvent mixture prior to forming an addition product with the cholesterol. This addition product is secured by a special reagent which consists of maleic acid or a mixture of maleic and oxalic acids, and increased yield is secured from a given volume of the addition product, the latter being light and crystalline and easily filtered and washed.

These and other characteristics of the process will be described with reference to the accompanying drawings.

Referring to the drawings, a charge of lanolin alcohols, which may be 1200 lbs., will be acted upon in the distillation kettle I by a mixture of solvents. It may be assumed that these alcohols have been obtained by the saponification of wool grease led from supply tank II to a reactor vessel III in which a desired saponification is secured. It may also be assumed that the extractor vessel IV containing a solvent for the lanolin alcohol content of the saponified grease but neutral to the soaps, per se, will receive the soaps, that the lanolin alcohols will be brought into solution and thus separated from the soaps held in extractor vessel IV after removal of the initial solvent. Of course any other method resulting in lanolin alcohols for initial treatment in extractor vessel IV may be used.

A solvent consisting of acetone-methanol (85% acetone, 15% methanol, being an example), is led into extractor vessel IV, the extractor holding, for example, 1200 lbs. of lanolin alcohols and an equal proportion of the acetone methanol solvent. After the solution is complete, the latter is transferred by valve-controlled pipe $b$ to distillation kettle I, and distillation is continued until 765 gallons of solvent have been distilled to bring the concentration to 1200 lbs. of lanolin alcohols—435 gallons of solvent.

After gradual cooling to about 120° F., the solution is pumped to the lanosterol crystallizer VI. In the crystallizer the solution is cooled to about 75° F., and may be maintained at this temperature for twelve hours, more or less. By such cooling in the crystallizer, the lanosterol precipitates out and may be separated from the solvent by a centrifuge schematically indicated at VII.

The solution of cholesterol and aliphatic alcohols, from which the lanosterol has now been removed, is evaporated to recover the solvent. For this purpose, the said solution is pumped by pump $d$ to a feed tank VIII and thence to a distillation kettle IX. When the said solvent is removed via valve-controlled pipe $e$, condenser $f$, pre-heater $g$, pipe $h$ and wet solvent tank X, the said lanosterol-free lanolin alcohols receive another solvent in distillation kettle IX, the said solvent being ethylene dichloride, which may be led from tank XI through valve-controlled pipe $i$. The distillation kettle may be under elevated temperature, 180° F. being suitable. Solvents equivalent to ethylene dichloride are aromatic and aliphatic hydrocarbons.

To the last-named solution in kettle IX is added 10% by weight of the lanolin alcohols in the form of a material which will consist of either a mixture of oxalic acid and maleic acid, or the latter alone. A preferred ratio is 80% oxalic acid and 20% maleic acid. As stated, the mixture may be 10% by weight of the lanolin alcohols, but excellent results have been secured with only 7.5% of the mixed acids. The ratios of the mixture of acids may range from 2% maleic, 98% oxalic to 98% maleic, 2% oxalic.

The addition product is formed under suitable elevated temperature, 180° F. being suitable, and under agitation in distillation kettle IX, a suitable time of treatment being 2½ to 3 hours.

In the action of distillation kettle IX, the distillation may be under partial vacuum. In any event, distillation may be continued until 240 gallons of ethylene dichloride are removed from the initial charge of about 480 gallons, that is to say, the reduction is about one-half the original volume of ethylene dichloride solvent.

The succeeding step is to cool the mixture in the distillation kettle IX under agitation, and agitation may be stopped when 90 F. is reached. The solvent mixture may then be cooled to 65° F. to crystallize out the cholesterol addition product. The ethylene dichloride solution with contained cholesterol addition product and aliphatic alcohols is drained into a centrifuge XII and the cholesterol addition product is unloaded from the centrifuge.

In the distillation by kettle IX, the solvent vapors will be driven upwardly through pipe $k$ to condenser $l$ and from water separator $m$ to ethylene dichloride tank XI. The ethylene dichloride solution drained from the centrifuge XII may be pumped to distillation kettle XIII and led to pipe k leading to tank XI.

The addition product is led to a steam-jacketed hydrolyzer tank XIV, and solvent of the class of alcohols or ketones, or a mixture thereof, may be used to hydrolize the addition product. The addition product goes into solution and the solution is then allowed to cool to room temperature. The addition product prior to the transfer to the jacketed tank is in the form of a powder and in practice is introduced through a chute s to tank XIV. The proportion of solvent to the addition product is initially approximately ten to one. The addition product goes into solution, the temperature in the solvent tank being at the boiling temperature of the solvent, say, 140° F. After hydrolysis the solution is concentrated to a ratio of five to one and is then cooled down to room temperature, say 70–80° F., and the cholesterol precipitates. If the solution is clear, precipitation of the crystalline cholesterol can be effected in the said hydrolyzer XIV.

For clarification of the cholesterol solution, it may be passed with solvent by pump n and pipe o to filter $o^x$ and thence to the primary cholesterol crystallizer XV, where the solvent ratio is preferably reduced to 5–1, as indicated above, by distilling off a portion of the solvent, which may be an acetone-methanol mixture. The cholesterol crystals with accompanying solvent are then passed to a centrifuge XVI and the solvent is drawn off therefrom and passed by pump p and valve-controlled pipe r to a distillation kettle XVII, and thence through valve-controlled pipe s, condenser f, and pipe h to wet solvent storage tank X.

If desired, the primary cholesterol crystals may be recrystallized in recrystallizer XVIII in the presence of mother liquor drawn from tank XIX.

The recrystallizer discharges into a centrifuge XXIV and the mother liquor therefrom may be passed back to the tank XIX by pump t and pipe w.

In the drawings the elements XX are oil strippers, the elements XXI are storage chambers for chemicals, the element XXII is a mixer, the element XXIII is a rectifier and the elements XXV and XXVI are condensers.

It will be understood that various modifications may be made in the conditions and steps of the process above described without departing from the spirit of the invention, as set forth in the attached claims.

Having described our invention, what we claim and desire to secure by Letters Patent, is as follows:

1. A method for producing cholesterol from lanolin alcohols, which comprises dissolving lanolin alcohols in a solvent consisting of a mixture of a ketone and an alcohol at a temperature about 134° F., lowering the temperature to the degree at which lanosterol is precipitated out of the solution, and separating the same, removing the solvent from the solution of cholesterol and aliphatic alcohols which remain after removal of the lanosterol, employing a second solvent consisting of ethylene dichloride or its equivalent to take up the cholesterol and aliphatic alcohols, adding a mixture of maleic and oxalic acids to form an addition product with the cholesterol at a temperature of about 180° F., lowering the temperature and crystallizing out the cholesterol addition product, dissolving the addition product in a solvent selected from the group of alcohols and ketones and mixtures thereof, at an elevated temperature, and cooling the last-named solution until precipitation of the cholesterol.

2. A method for producing cholesterol from lanolin alcohols, which comprises dissolving lanolin alcohols in a solvent consisting of a mixture of acetone and alcohol at a temperature about 134° F., lowering the temperature to the degree at which lanosterol is precipitated out of the solution, and separating the same, removing the solvent from the solution of cholesterol and aliphatic alcohols which remain after removal of the lanosterol, employing a second solvent consisting of ethylene dichloride and its equivalent to take up the cholesterol and aliphatic alcohols, adding maleic acid to form an addition product with the cholesterol at a temperature of about 180° F., lowering the temperature and crystallizing out the cholesterol addition product, dissolving the addition product in a solvent selected from the group of alcohols and ketones and mixtures thereof, at an elevated temperature, and cooling the last-named solution until precipitation of the cholesterol occurs.

3. A method for producing cholesterol from lanolin alcohols, which comprises dissolving lanolin alcohols in a solvent consisting of about 85% acetone and about 15% methanol at a temperature about 134° F., lowering the temperature to the degree at which lanosterol is precipitated out of the solution, and separating the same, removing the solvent from the solution of cholesterol and aliphatic alcohols which remain after removal of the lanosterol, employing a second solvent consisting of ethylene dichloride and its equivalent to take up the cholesterol and aliphatic alcohols, adding a mixture of about 2% to about 98% maleic acid and about 98% to about 2% oxalic acid in the proportion of from about 7.5% to about 10% of mixed acids to about 92.5%–90% of the weight of lanolin alcohol to form an addition product with the cholesterol at a temperature of about 180° F., lowering the temperature and crystallizing out the cholesterol addition product, dissolving the addition product in a solvent selected from the group of alcohols and ketones and mixtures thereof, at an elevated temperature, and cooling the last-named solution until precipitation of the cholesterol.

PETER VATERRODT.
JAMES McNELLIS.

REFERENCES CITED

The following references are of record in the file of this patent:

UNITED STATES PATENTS

| Number | Name | Date |
| --- | --- | --- |
| 2,302,679 | Drekter | Nov. 24, 1942 |
| 2,362,605 | Loder | Nov. 14, 1944 |